April 24, 1934.   R. EICHENAUER   1,956,438
DEVICE FOR PROTECTING MOTOR CARS AGAINST THEFT
Filed Jan. 29, 1931
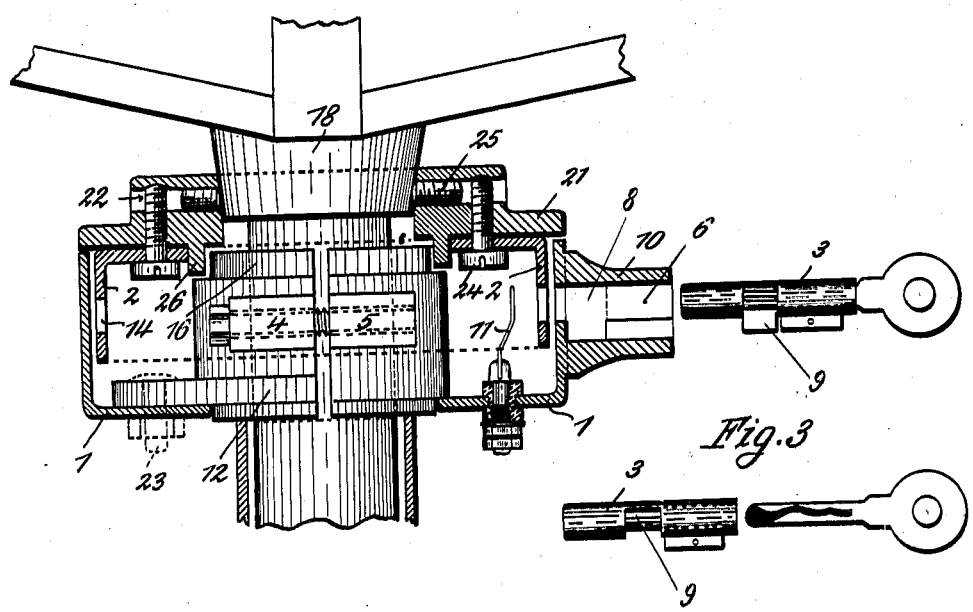
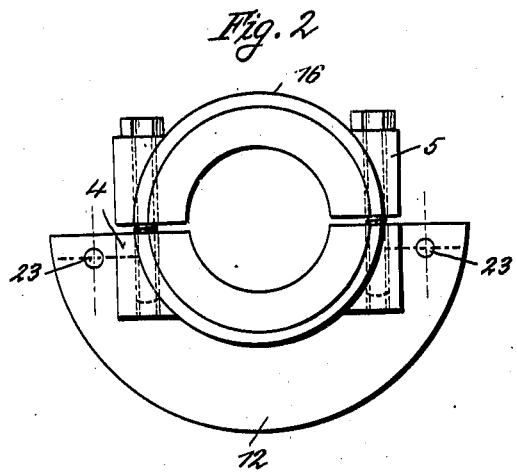
Inventor.

Patented Apr. 24, 1934

1,956,438

UNITED STATES PATENT OFFICE 1,956,438

DEVICE FOR PROTECTING MOTOR CARS AGAINST THEFT

Rudolf Eichenauer, Frankfort-on-the-Main, Germany

Application January 29, 1931, Serial No. 512,229
In Germany September 10, 1930

1 Claim. (Cl. 70—90)

This invention relates to a device for protecting motor cars against theft, the device being secured to the steering gear of the vehicle to be protected in order to block the steering wheel and, simultaneously, to connect the signal system to the battery circuit.

Compared with existing types, the device according to the invention is superior in so far as it is of particularly simple design and can be subsequently attached to any car so as to lock fastening parts against unauthorized handling.

One embodiment of the invention is illustrated in the accompanying drawing, in which Figure 1 is a cross section of the device, showing how the device is secured to cars the steering post of which is located in a guide tube; Figure 2 shows a top view of a pipe clip which is the main fastening part of the device; and Figure 3 is an exploded view of the bolt-lock and key, the lock being in locked position.

Referring to the drawing, the device consists in the main of two capsular round shells represented by 1 and 2 which are telescoped so as to form a round drum and permit the smaller shell 2 to rotate easily within the larger shell 1. Since all fastening means are positioned within the drum formed by the two shells 1 and 2 and, when the car is locked, these two drum portions cannot be separated, the fastening means cannot be disassembled by unauthorized persons.

The edge of the shell 1 carries a tubular socket 10 having a keyhole-shaped longitudinal bore 6 and a round longitudinal bore 8. A bolt-lock 3 which is shown by Fig. 3 is to be inserted through or removed from the casing 10. Said bolt-lock has a key-bit-shaped extension 9 which is to be turned by means of a key within the bore 8, whereby removing of said lock bolt from the casing 10 is stopped. This casing receives and holds fast to said detachable locking member the point of which is provided with a steel sleeve and, during the locking action, engages a notch 14 of the shell 2, whereby rotary motion is stopped and separation of the two shells rendered impossible. Since the two shells 1 and 2 are thus connected with both the rotary and stationary part of the steering gear, steering is blocked and the parts arranged inside the drum cannot be disassembled.

Most steering wheels have a projection 18 under their spokes, which serves for securing the rotatable smaller half of the drum. As Fig. 1 indicates, an annular member 21 whose bore is adapted to the projection 18 surrounds the latter and is provided with the lateral threaded bores 22 directed towards the center into which the screws 25 are inserted, the points of which enter the projection 18 and thus secure the annular member 21 to the projection 18. The shell 2 is secured to the annular member 21 by means of the screws 24 whose bores cross those of the screws 25 so that access to, and unauthorized loosening of the fastening screws 25 is rendered impossible by the bodies of the screws 24 after the shell 2 has been secured to the annular member 21.

The round shell 2 is provided at its edge with locking notches 14 and in its bottom with a bore fitting exactly around the projection 26 of the annular member 21, which serves as bearing, and is secured by means of the screws 24.

The projection 26 fits over the bearing surface 16 of the two clip portions 4 and 5 which are shown by Fig. 2.

The clips 4 and 5 secure the other half of the drum to the steering column. When screwed together, the two clip portions 4 and 5 form on one side the bearing surface 16 while their other side serves for fastening. For this purpose the clip portion 4 is provided with a lateral segment 12 wherein the two stay-bolts 23 are screwed and riveted which serve to secure the shell in position.

An insulated contact spring 11 is disposed on the bottom of the shell 1 and touched by the locking pin entering a notch 14 so that a circuit is closed which serves to warn the rightful car user.

I claim:—

In a device of the class described, comprising in combination with the hub of a steering wheel and a cap-shaped projection on said hub, headless screws radially extending from said hub, an annular member on said hub having radially extending bores one for each of said headless screws and internally threaded in the inner end portion to receive said headless screws, and screw bolts screwed from below through said cap-shaped projection and said annular member so that they extend into said radial bores and have access to said headless screws.

RUDOLF EICHENAUER.